Aug. 30, 1938.  H. E. TWOMLEY  2,128,545
MECHANICAL MOVEMENT
Filed Jan. 4, 1937  3 Sheets-Sheet 3

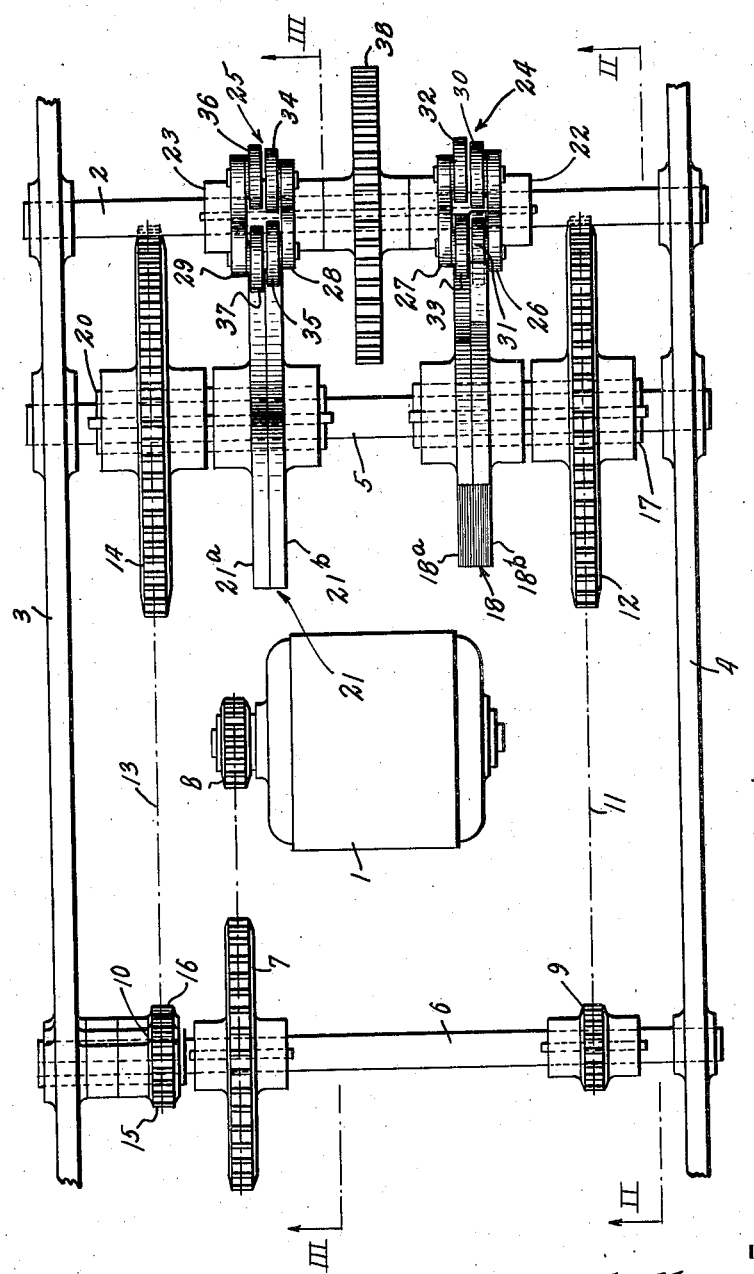

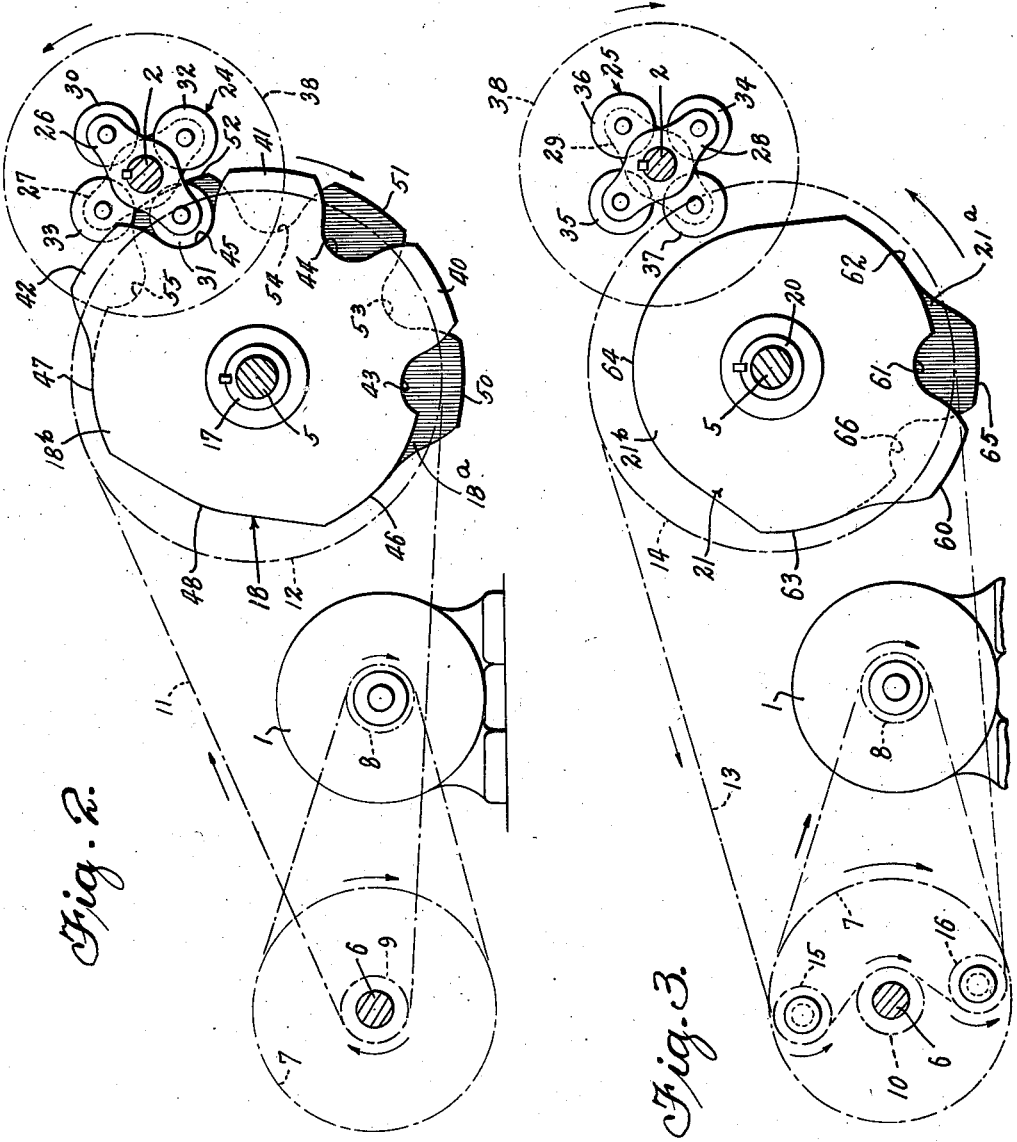

INVENTOR.
Herbert E. Twomley
BY Lyon & Lyon
ATTORNEYS

Patented Aug. 30, 1938

2,128,545

UNITED STATES PATENT OFFICE 2,128,545

MECHANICAL MOVEMENT

Herbert E. Twomley, Riverside, Calif., assignor to Food Machinery Corporation, San Jose, Calif., a corporation of Delaware Application January 4, 1937, Serial No. 118,942

11 Claims. (Cl. 74—70)

This invention relates to mechanical movements and particularly to movements for successively rotating a shaft or other rotatable machine element first in one direction through a desired arc and then in the opposite direction through an arc that may or may not be the same as the first arc.

An object of the invention is to provide a simple and practicable mechanical movement capable of operating smoothly and with minimum shock to rotate an element alternately in each direction, through the same or different arcs in each direction, and with pauses of the same or different duration following each movement.

In automatic machines it is often necessary to rotate one or more elements first in one direction through a definite arc and then in the opposite direction through a definite arc which may be the same as or different from the arc of movement in the first direction. Furthermore, this motion must usually be derived from a motor or engine rotating continuously in one direction and must be in timed relation with other parts of the machine. I recognize that there are many known mechanisms for obtaining such movements but the present invention is simple, adaptable to different degrees of movement and operates more smoothly than those other movements (capable of performing the same operations) with which I am familiar.

Numerous examples of automatic machines requiring automatic rotation of an element in both directions might be given but since the mechanism for producing the reversing movement does in any event constitute a separate invention, it may be explained by describing certain specific embodiments of the mechanism capable of imparting the desired movement to a shaft, it being understood that the shaft may be coupled directly by gears or any known means to the particular element of any particular machine requiring the reversing motion.

In the drawings:

Fig. 1 is a plan view of one embodiment of mechanism in accordance with the invention;

Fig. 2 is a skeleton view in a vertical section taken in the plane II—II of Fig. 1;

Fig. 3 is a skeleton view in a vertical section taken in the plane III—III of Fig. 1;

Figure 5:
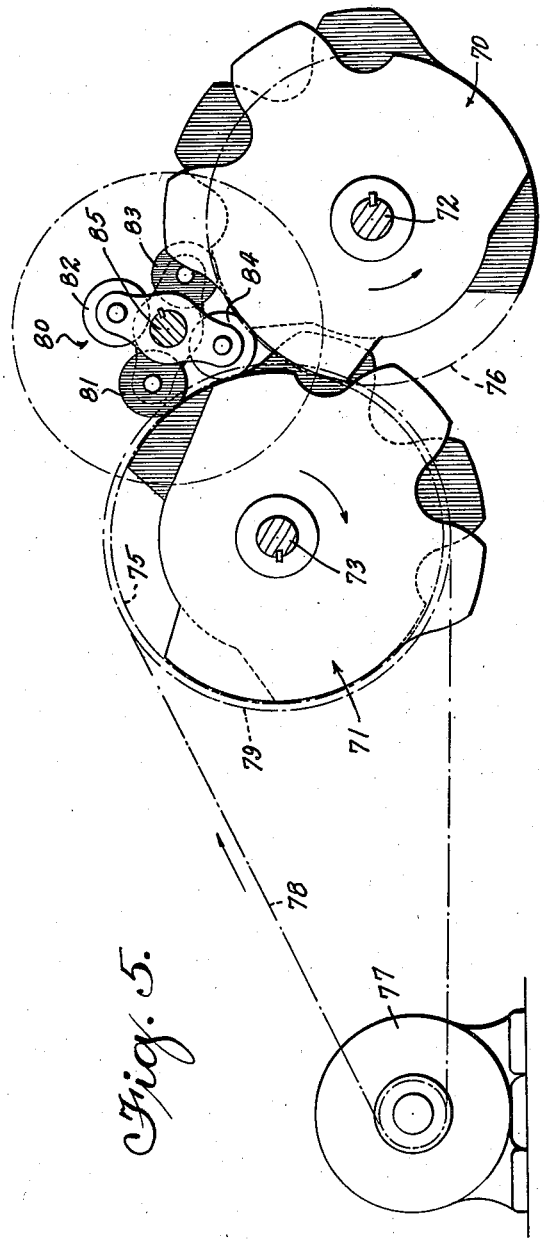
Fig. 5 is a skeleton view taken in a vertical plane, illustrating details of construction and the operation of the mechanism shown in Fig. 4.

Referring first to Figs. 1, 2 and 3, the mechanism therein depicted comprises a source of continuous rotary motion in one direction 1 illustrated as an electric motor and a power output shaft 2 adapted to be successively rotated in opposite directions in response to continuous rotation in one direction of the shaft of motor 1. The shaft 2 is supported at its opposite ends in frame members 3 and 4, respectively. These frame members also support a shaft 5 positioned between the motor 1 and shaft 2 and a shaft 6 shown positioned on the opposite side of motor 1.

Shaft 6 is rotatable in its supporting bearings in the frame members 3 and 4 and has keyed thereto a sprocket wheel 7 which is coupled by a chain to a sprocket wheel 8 on the shaft of the motor 1 so that shaft 6 is at all times driven continuously in one direction in response to operation of the motor. Shaft 6 also has keyed thereto at longitudinally spaced points on opposite sides of the sprocket wheel 7 a pair of sprocket wheels 9 and 10, respectively. The sprocket wheel 9 is coupled by a chain 11 to a sprocket wheel 12 on one end of shaft 5 so that the sprocket 12 rotates in the same direction as the shaft 6. The sprocket wheel 10 is coupled by a chain 13 to a second sprocket wheel 14 on the other end of shaft 5 but in this instance the chain contacts the side of the sprocket 10 which is adjacent to the sprocket 14, the chain being guided against this side of sprocket wheel 10 by a pair of idler sprockets 15 and 16 positioned above and below the sprocket wheel 10 and rotatably supported from the frame member 3. The sprocket wheel 10 therefore rotates the sprocket wheel 14 in a direction opposite to the direction of rotation of sprocket wheel 12.

Sprocket wheel 12 is not directly mounted upon the shaft 5 but is keyed to a sleeve 17 which in turn is freely rotatably mounted on the shaft 5. The sleeve 17 also has keyed thereto for rotation therewith a cam wheel 18 consisting of two sections 18a and 18b which may be formed integrally if desired and rotate as a unit with each other and the sleeve 17.

The sprocket wheel 14 likewise, instead of being mounted for rotation directly about the shaft 5, is keyed to a sleeve 20, which itself is freely rotatable on the shaft, and the sleeve 20 also has keyed thereto a cam wheel 21 consisting of two sections 21a and 21b, mounted side by side, which may be formed integrally with each other and rotate as a unit with the sleeve 20.

The shaft 2 has keyed thereto two sleeves 22 and 23, respectively, and the sleeve 22 has mounted thereon a follower assembly 24 cooperating with the cam wheel 18 and the sleeve 23 carries a follower assembly 25 cooperating with the cam wheel 21.

The follower assemblies 24 and 25 are identical, the assembly 24 comprising two longitudinally spaced arms 26 and 27 positioned crosswise with respect to each other and the assembly 25 carrying two similarly positioned arms 28 and 29, respectively. The arm 26 has rotatably mounted thereon at its opposite ends a pair of rollers 30 and 31, respectively, juxtaposed to and adapted to cooperate with the section 18b of cam wheel 18. The arm 27 carries at its opposite ends two rollers 32 and 33, respectively, juxtaposed to and adapted to cooperate with section 18a of cam wheel 18. The arm 28 of follower assembly 25 has rollers 34 and 35, respectively, juxtaposed to and cooperating with section 21b of the cam wheel 21 and arm 29 has mounted thereon at its opppsite ends rollers 36 and 37, respectively, juxtaposed to and adapted to cooperate with section 21a of cam wheel 21. Shaft 2 also has keyed thereto a gear wheel 38 adapted to mesh with a gear on a shaft to be driven from shaft 2. It is to be understood, however, that if desired the mechanism to be driven by shaft 2 may be coupled thereto in any desired manner.

As previously indicated, the cam wheels 18 and 21 are continuously rotated in opposite directions when the motor 1 is in operation and each section of each cam wheel has lobes, dips, dwells and recesses thereon. Thus referring to Fig. 2 the section 18b of cam wheel 18 has lobes 40, 41 and 42 thereon, dips 43, 44 and 45, dwells 46 and 47, respectively, and a recess 48. The lobes 40, 41 and 42 are of such height as to intercept the rollers 30 and 31 and the dips 43, 44 and 45 are of such depth as to permit passage of the rollers 30 and 31. The dwells 46 and 47 are of height intermediate the dips and lobes so that they prevent rotation of the rollers 30 and 31 therepast when in juxtaposed position. The recess 48 is as low or lower than the dips 43, 44 and 45 so that when the recess is juxtaposed to the follower assembly 24 the rollers 30 and 31 can rotate freely without interference with the cam.

The section 18a of cam wheel 18 likewise has lobes 50, 51 and 52, dips 53, 54 and 55, dwells 46 and 47, and a recess 48, these dwells and recess being juxtaposed to and bearing the same reference numerals as the corresponding dwells and recesses described on section 18b.

The section 21b of cam wheel 21 (Fig. 3) is provided with a single lobe 60, a single dip 61, dwells 62 and 63, and a recess 64. Section 21a of cam wheel 21 has a single lobe 65, a single dip 66, dwells 62 and 63 and a recess 64 juxtaposed to the dwells and recess bearing the same reference numerals on section 21b.

In operation the lobes and dips on the cam wheels 18 and 21 alternately engage the rollers on their associated followers to first rotate the shaft 2 in one direction and then in the other direction. With the particular arrangement of cam wheels shown, the shaft 2 remains stationary for short intervals between successive movements in opposite directions and it is held positively in stationary position during such intervals by the dwells on the cam wheels.

Thus referring to Figs. 2 and 3, which show the cam wheels and follower assemblies in the relative positions they occupy at a given instant, it will be observed that the lobe 42 is engaging the roller 31 and driving the shaft 2 in a counterclockwise direction. The lobe 52 has just ceased driving the roller 32 in the same direction. By virtue of the fact that the lobes on the two sections of the cam wheel alternately engage rollers on the associated follower, continuous driving motion on the shaft 2 is obtained during each period of movement. While the cam wheel 18 is driving the follower 24 the rollers of the follower 25 are out of contact with the cam wheel 21 because the recess 64 on the latter is moving past the follower.

However, after lobe 42 has ceased to drive the roller 31 the roller 33 will still be nested within the dip 55 and will be revolved by contact with the driving edge of the dip 55, thereby revolving the shaft 2 still in a counter-clockwise direction until the roller 33 rides out of the dip 55 onto the dwell 47. While roller 33 is in contact with dwell 47 no rotary driving force is applied to the shaft 2 but reverse motion of the shaft is prevented by contact of roller 33 with dwell 47. At the same time the rotation of the shaft 2 will have carried the roller 30 onto the dwell 47, thereby preventing any continued movement of the shaft 2 in a counter-clockwise direction so that the shaft 2 is positively maintained in stationary position while the dwell 47 is passing the follower assembly 24. Slightly before the dwell 47 on the cam wheel 18 is carried (by the continued rotation of the cam wheel) out of engagement with the rollers 33 and 30, the dwell 62 on the cam wheel 21 will have been carried into such position as to contact the rollers 35 and 36 on follower 25. The dwell 62 cooperating with rollers 35 and 36 therefore takes control of the shaft 2 as soon as control thereof is released by the dwell 47 on cam 18, to prevent any rotation of the shaft 2 in either direction.

Continued rotation of the cam wheel 21 in a counterclockwise direction brings the lobe 65 into engagement with the cam wheel 36, thereby causing rotation of the shaft 2 in a clockwise direction. Such rotation is possible by virtue of the fact that the dip 61 simultaneously reaches the roller 35, permitting the latter to pass off the dwell 62 and rotate. As soon as lobe 65 releases roller 36, lobe 60 continues to drive the shaft 2 in a clockwise direction through roller 35, the roller 37 then passing into the dip 66. As roller 37 emerges from dip 66, it rides onto the dwell 63 and at the same time roller 34 comes into contact with dwell 63; thereby the cam wheel 21 not only ceases to drive the shaft 2 in a clockwise direction but positively maintains it against rotation in any direction. During this driving operation of the cam wheel 21 the recess 48 on cam wheel 18 was passing the cam follower 24. However, by the time the dwell 63 on cam wheel 21 passes out of engagement with the rollers of the follower 25, the dwell 46 on cam wheel 18 will have taken control of follower 24 to hold the shaft 2 stationary until the lobe 50 and dip 43 reach the follower 24 whereupon the motion of the shaft 2 in a counterclockwise direction is resumed. Obviously by varying the numbers of the dips and lobes on the two cam wheels 18 and 21, respectively, the angular rotation in each direction of the shaft 2 may be varied within wide limits. Likewise the lengths of the pauses between movements can be varied by varying the lengths of the dwells on the cam wheels.

A particular advantage of the construction disclosed is that by varying the slopes of the end faces of the lobes 42, 50, 60 and 65, the rate at which the shaft 2 is accelerated following each pause may be varied within between wide limits. Thus by sloping the end faces of the end lobes very gradually into the adjacent dwells the lobes can be caused to "pick up" their associated rollers very gradually and produce a gradual acceleration of the shaft 2, thereby eliminating to a large extent shock and vibration in the operation of the machine.

Figure 4:
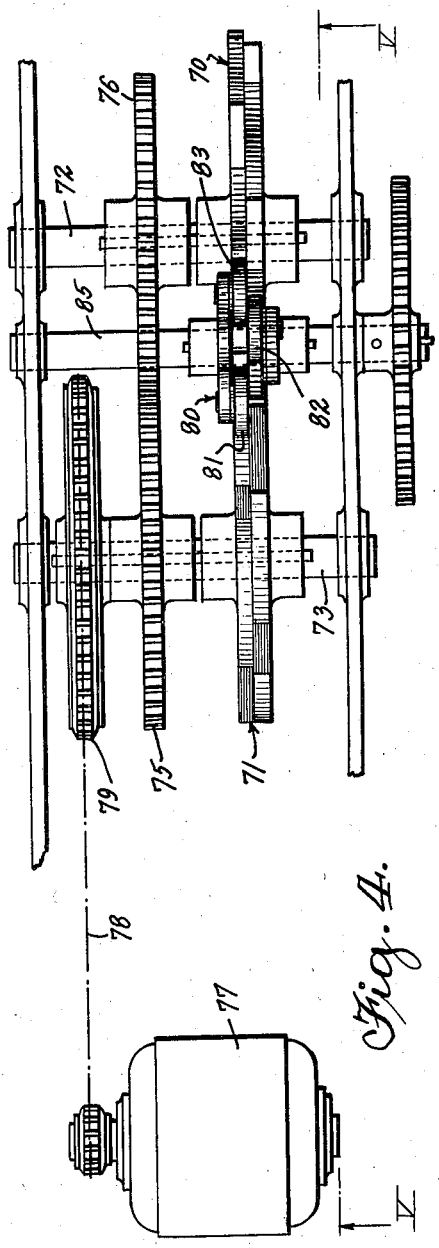
Fig. 4 is a plan view of a modified form of mechanism.

The structure shown in Figs. 4 and 5 works in the same general manner as the structure described with reference to Figs. 1, 2 and 3 except for certain changes that reduce the number of parts required. Thus whereas in Fig. 1 the two driving cam wheels 18 and 21 were coaxially mounted and cooperated with different cam followers 24 and 25 on the driven shaft 2, in Figs. 4 and 5 two cam wheels 70 and 71, respectively, are mounted on separate spaced apart shafts 72 and 73, respectively. Cam wheels 70 and 71 are keyed to their associated shafts 72 and 73, respectively, for rotation therewith and the shafts also have keyed thereto for rotation therewith a pair of intermeshing gears 75 and 76, respectively, which force the two shafts to rotate simultaneously in opposite directions at all times. Driving power may be applied to either shaft 72 and 73 but as shown in the drawings is applied to shaft 72 from a motor 77 through the intermediary of a driving chain 78 and a sprocket wheel 79 keyed to the shaft 73.

The fact that the cam wheels 70 and 71 are spaced apart laterally instead of being mounted coaxially permits them to be mounted for rotation in the same plane with each other and with a single follower 80 bearing four rollers 81, 82, 83 and 84 of the same identical structure as the followers 24 and 25 in Fig. 1.

The structure shown in Figs. 4 and 5 functions in exactly the same manner as that described with reference to Figs. 1, 2 and 3 except that both cam wheels 70 and 71 act upon the same follower 80 instead of acting upon two separate followers mounted on the same shaft. Of course the shafts 72 and 73 must be spaced apart a sufficient distance relative to the radial dimensions of the two cam wheels 70 and 71 so that they will clear each other and not interfere. When a cam follower employing four rollers is used it is also desirable that the shafts 73 and 72 be so positioned relative to the shaft 85, on which the follower 80 is mounted, that the lines extending from the center of shaft 85 to the centers of shafts 72 and 73, respectively, intersect to form an angle of either 90° or 180°. In the structures shown in Figs. 4 and 5, the shafts 72 and 73 are displaced 90° apart about the shaft 85. This displacement of either 90° or 180° permits control of the follower to pass smoothly from one cam wheel to the other. Thus with the parts in the position shown in Fig. 5 the cam wheel 71 has just completed rotation of the follower 80 in a counterclockwise direction and the follower wheels 81 and 84 are resting on the dwells of cam wheel 71. At the same time rollers 83 and 84 are resting on dwells on cam wheel 70 so that both cam wheels are maintaining the follower against rotation in either direction. It will be apparent that the 90° or 180° positioning of the shafts 72 and 73 about the shaft 85 is necessary when the follower consists of four rollers if the concentric dwells on both cam wheels are to each contact two rollers on the follower simultaneously. While this condition is desirable, however, it is not absolutely necessary in many cases. Thus it will be observed that in the position shown in Fig. 5 dwells on the two cam wheels 70 and 71, respectively, are both contacting the roller 84 simultaneously on opposite sides thereof so that the dwells contacting this roller 84 alone are sufficient to prevent rotation of the shaft 85.

Obviously the number of lobes and dips and the lengths of the dwells of the two cam wheels 70 and 71 may be varied within wide limits to rotate the shaft 85 through different arcs in opposite directions and to hold the shaft against movement for different lengths of time between rotations in opposite directions.

Although the invention has been explained by describing two specific embodiments thereof, it is to be understood that these embodiments are merely examples and that various modifications may be made without departing from the invention as set forth in the appended claims.

I claim:

1. In combination, a driven shaft and means for alternately rotating said driven shaft in opposite directions through predetermined arcs comprising a plurality of cam followers supported on said driven shaft for rotation therewith, a pair of rotary driving members the axes of which are parallel to but spaced from said driven shaft, and means for continuously rotating said driving members in opposite directions, cam means on each of said driving members dimensioned to intercept said cam followers on the driven shaft, each cam means having a series of lobes and dips so spaced as to successively engage successive followers on the driven shaft and impart continuous rotary movement to the driven shaft during passage of said lobes past said driven shaft, the two cam means being so oriented with respect to each other that their series of lobes engage followers on said driven shaft alternately and each cam means having a recess clearing its associated followers during driving engagement of the other cam with its associated followers.

2. In combination, a driven shaft and means for alternately rotating said driven shaft in opposite directions through predetermined arcs with predetermined pauses between opposite movements comprising a plurality of cam followers supported on said driven shaft for rotation therewith, a pair of rotary driving members the axes of which are parallel to but spaced from said driven shaft, and means for continuously rotating said driving members in opposite directions, cam means on each of said driving members dimensioned to intercept said cam followers on the driven shaft, each cam means having a series of lobes and dips so spaced as to successively engage successive followers on the driven shaft and impart continuous rotary movement to the driven shaft during passage of said lobes past said driven shaft, the two cam means being so oriented with respect to each other that their series of lobes engage followers on said driven shaft alternately and each cam means having a recess clearing its associated followers during driving engagement of the other cam with its associated followers, and at least one of the cam means having a dwell thereon between the lobes thereon and the recess thereon for maintaining the driven shaft stationary between two consecutive movements in opposite directions.

3. In combination, a driven shaft and means for alternately rotating said driven shaft in opposite directions through predetermined arcs with predetermined pauses between opposite movements comprising a plurality of cam followers supported on said driven shaft for rotation therewith, a pair of rotary driving members the axes of which are parallel to but spaced from said driven shaft, and means for continuously rotating said driving members in opposite directions, cam means on each of said driving means dimensioned to intercept said cam followers on the driven shaft, each cam means having a series of lobes and dips so spaced as to successively engage successive followers on the driven shaft and impart continuous rotary movement to the driven shaft during passage of said lobes past said driven shaft, the two cam means being so oriented with respect to each other that their series of lobes engage followers on said driven shaft alternately, each cam means having a recess clearing its associated followers during driving engagement of the other cam with its associated followers, said cam means having cooperating dwells thereon between their lobes and recesses, respectively, for maintaining the driven shaft stationary between consecutive movements in opposite directions.

4. A mechanism as described in claim 1 in which successive cam followers on said driven shaft are spaced longitudinally from each other into two groups and each cam means comprises two longitudinally spaced cams each cooperating with one of said groups of followers and having its lobes staggered circumferentially with respect to the lobes of its associated cam.

5. A mechanism as described in claim 1 in which the end faces of the end lobes in each series of lobes rise gradually to smoothly accelerate and decelerate the driven shaft at the beginning and end of its motion in each direction.

6. A mechanism as described in claim 3 in which the end faces of the end lobes in each series of lobes rise gradually from the adjacent dwells to smoothly accelerate and decelerate the driven shaft at the beginning and end of its motion in each direction.

7. A mechanism as described in claim 2 in which said cam means are so oriented with respect to each other that dwells on said two cam means each simultaneously contact two followers on said driven shaft during a portion of said pause periods of said driven shaft to hold the latter stationary.

8. A mechanism as described in claim 1 in which successive cam followers on said driven shaft are spaced longitudinally from each other into two groups and each cam means comprises two longitudinally spaced cams each cooperating with one of said groups of followers and having its lobes staggered circumferentially with respect to the lobes of its associated cam, each cam also having dwells thereon of radius such that adjacent dwells on the two cams simultaneously engage different rollers on said cam follower, the dwell on one cam preventing rotation of the follower in one direction and the dwell on the other cam preventing rotation of the driven shaft of the follower in the opposite direction.

9. A mechanism as described in claim 1 in which said two driving members are angularly disposed from each other about the axis of the driven shaft and the two cam means on said respective driving members are mounted for rotation in the same plane and both cooperating with the same cam followers on said driven shaft.

10. A mechanism as described in claim 1 in which said two driving members are angularly disposed from each other about the axis of the driven shaft and the two cam means on said respective driving members are mounted for rotation in the same plane and both cooperating with the same cam followers on said driven shaft, and intermeshing gears on said two driving members for causing them to rotate in opposite directions in unison.

11. A mechanism as described in claim 1 in which successive cam followers on said driven shaft are spaced longitudinally from each other into two groups and each cam means comprises two longitudinally spaced cams each cooperating with one of said groups of followers and having its lobes staggered circumferentially with respect to the lobes of its associated cam, each cam also having dwells thereon of radius such that adjacent dwells on the two cams simultaneously engage different rollers on said cam follower, the dwell on one cam preventing rotation of the follower in one direction and the dwell on the other cam preventing rotation of the driven shaft of the follower in the opposite direction, the dwells on said two cam means being so oriented with respect to each other and said driven shaft that during each cycle of operation between movement of the driven shaft in opposite directions, dwells on said two cam means simultaneously contact the same follower on said driven shaft, the dwell on one cam preventing rotation of the follower in one direction and the dwell on the other cam preventing rotation of the follower in the opposite direction.

HERBERT E. TWOMLEY.